United States Patent [19]
Rosengren

[11] 3,880,030
[45] Apr. 29, 1975

[54] ROTARY CUTTER ASSEMBLY
[75] Inventor: Stanley Irving Rosengren, Morton Grove, Ill.
[73] Assignee: Nabisco, Inc., New York, N.Y.
[22] Filed: July 1, 1974
[21] Appl. No.: 484,684

[52] U.S. Cl. ............................. 83/9; 83/8; 83/12; 83/302; 83/665; 83/698; 425/291; 425/294
[51] Int. Cl. ........................................... A21c 11/04
[58] Field of Search ............... 83/9, 8, 12, 302, 301, 83/346, 698, 665; 425/291, 294; 93/58.2 R

[56] References Cited
UNITED STATES PATENTS

| | | | |
|---|---|---|---|
| 972,300 | 10/1910 | Vavra | 83/9 X |
| 1,357,665 | 11/1920 | Watkins | 83/9 |
| 3,364,877 | 1/1968 | Zublena | 425/294 |
| 3,770,358 | 11/1973 | Steels et al. | 425/291 |

Primary Examiner—Frant T. Yost
Attorney, Agent, or Firm—Gerald Durstewitz; I. A. Strombeck

[57] ABSTRACT

A plurality of annular dough scoring rings are positioned upon a cylindrical drum at regular intervals along its length. Each ring has a gap therein through which a dough cutting bar extends along the length of the drum perpendicular to the rings. An annular dough cutting ring is positioned on each end of the ring to trim the edges of the dough sheet operated upon. Between adjacent rings, a series of rectangular blocks are positioned about the periphery of the drum. A block is positioned on each side of the cutting bar, and short dough scoring bars positioned between the remaining blocks extend between the rings and at right angles thereto. The scoring rings and bars are formed with teeth of trapezohedron form which produce score lines in the dough sheet while preventing adhesion of the dough to the teeth.

8 Claims, 17 Drawing Figures

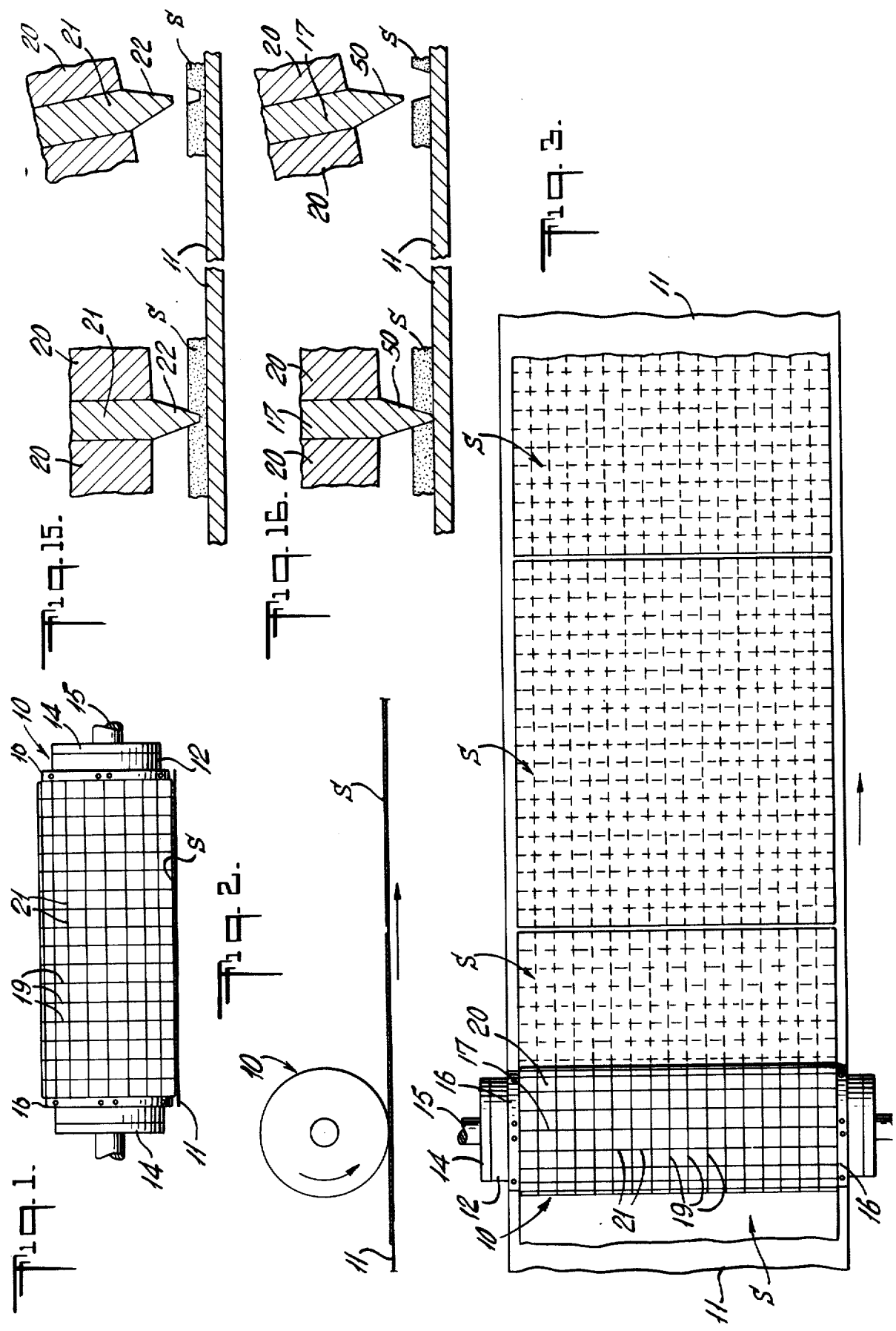

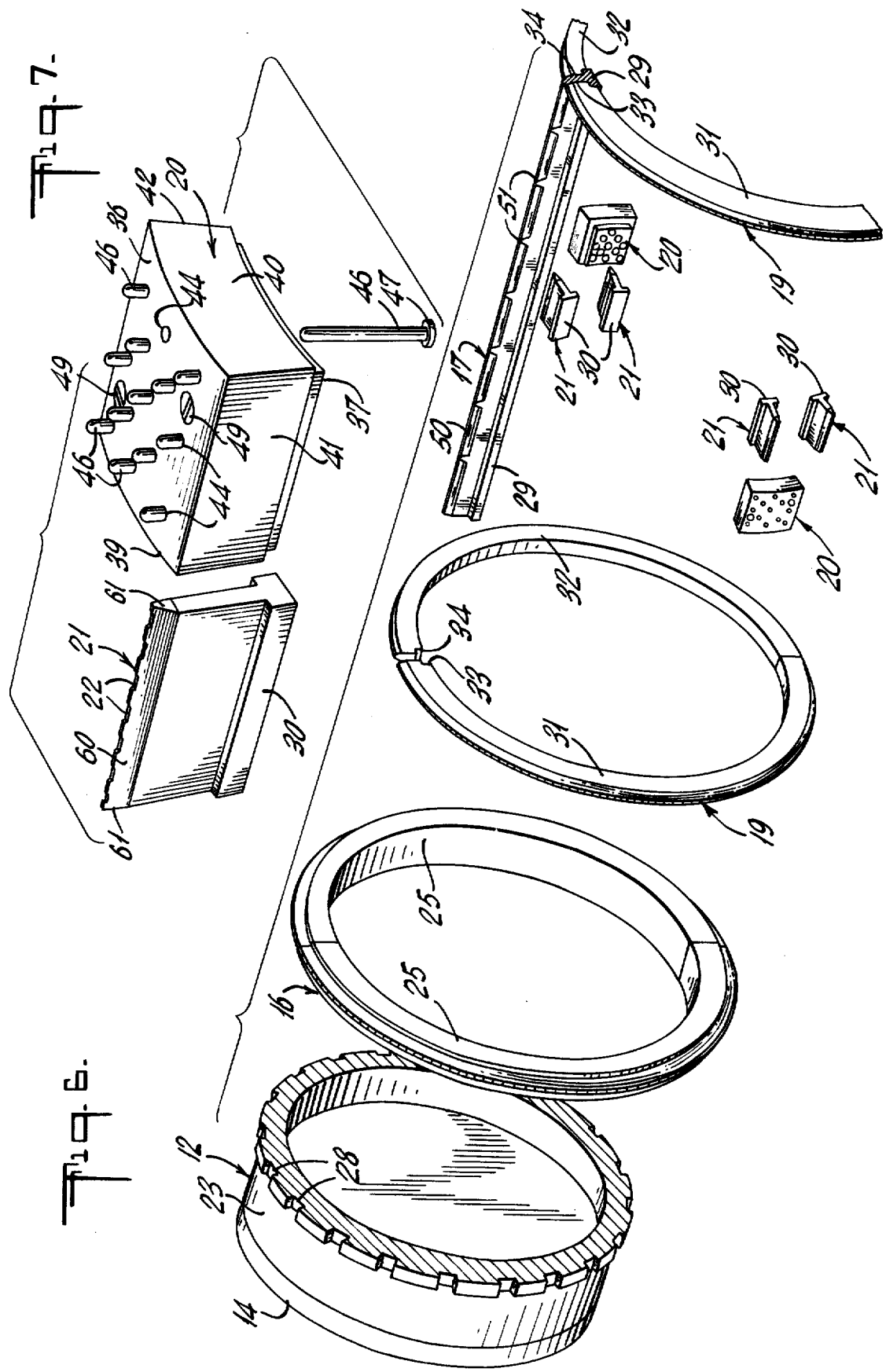

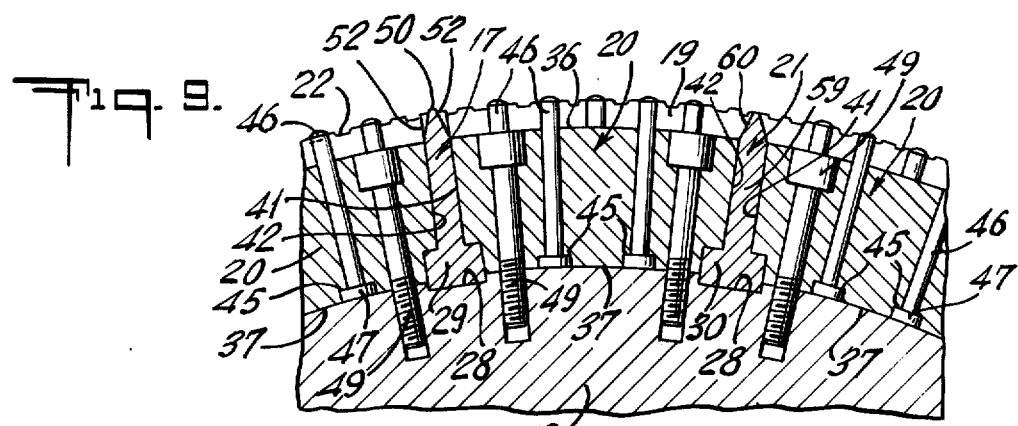
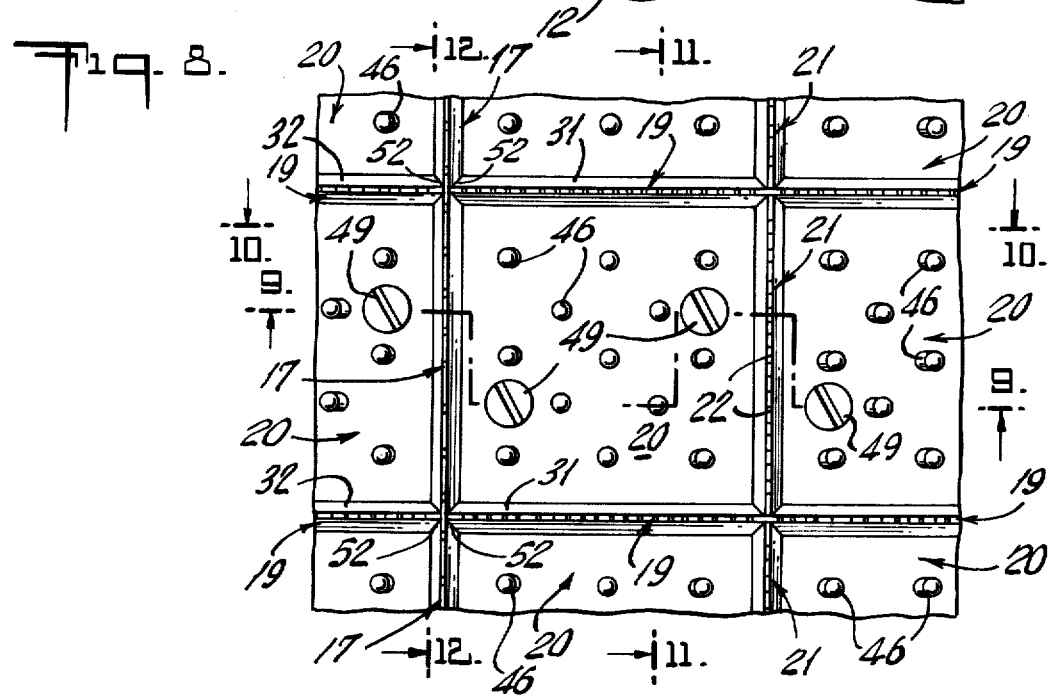
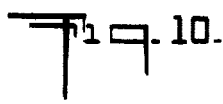
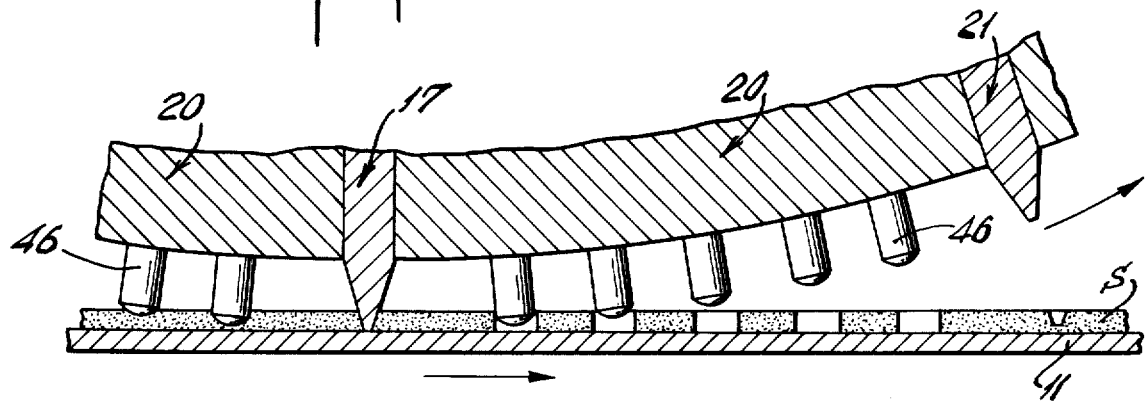

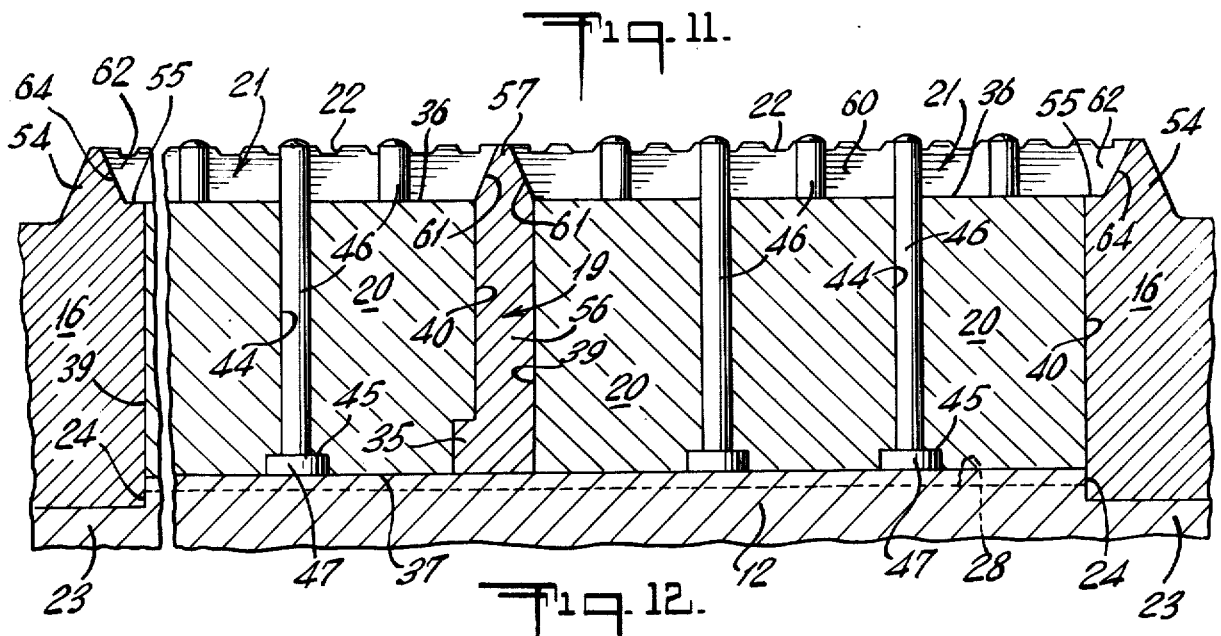
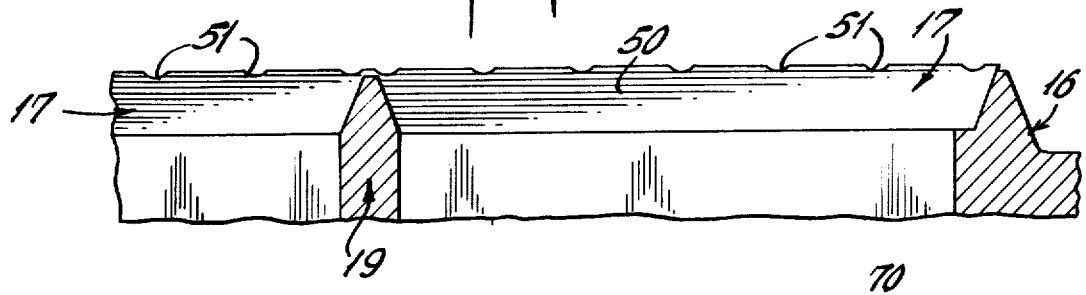
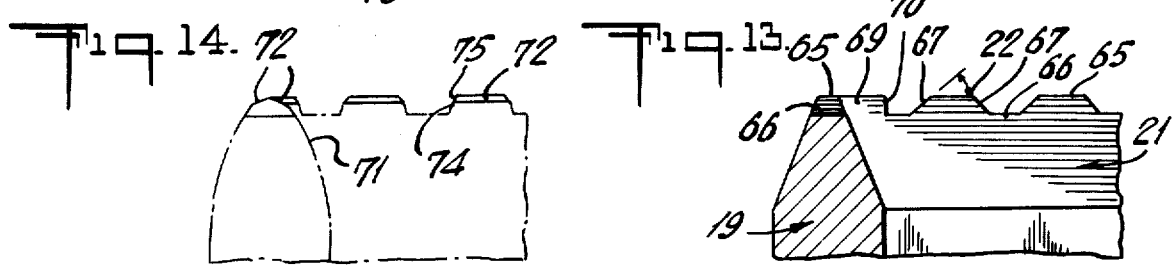
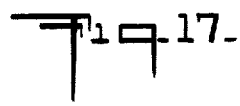
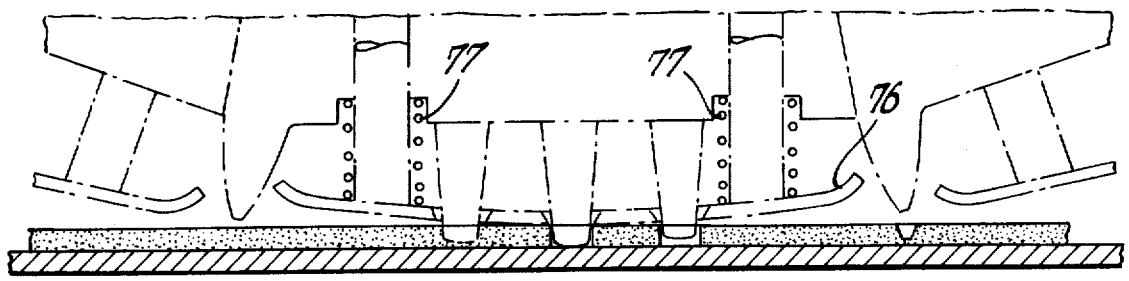

ROTARY CUTTER ASSEMBLY

BACKGROUND OF THE INVENTION

The present invention relates to apparatus for cutting and scoring a dough sheet to separate the dough sheet into a plurality of individual biscuits, crackers, or the like. More particularly, this invention relates to rotating cylindrical cutters designed to act upon a constantly advancing sheet of dough that is moved beneath the cutter by a fabric conveyor belt.

Rotary cutters for this purpose are formed with scoring members arranged on the surface of a drum to divide the surface into a plurality of areas, each having the size and shape of a single biscuit or cracker. The dough sheet passing under the cutter is partially severed by the scoring members to mark out on the sheet many biscuit sized pieces. A number of the scoring members are annular and extend around the circumference of the drum at regularly spaced intervals so as to produce a number of parallel continuous score lines along the length of the dough sheet. At the edges of the drum, dough cutting rings are positioned to trim the edges of the sheet. A plurality of scoring members together with a single dough cutting bar extend parallel to the axis of the drum and are spaced about the periphery of the cutter. In each revolution of the drum, the scoring members produce a series of regularly spaced score lines extending across the dough sheet perpendicularly to the longitudinal score lines and the cutting bar cuts through the sheet to form a dough section which is free to expand longitudinally during baking.

In the U.S. Pat. No. 2,887,964, which is assigned to the assignee of the present application, a rotary cutter is shown in which each of the annular scoring members is a continuous ring and each of the other scoring members is a continuous bar which extends between the cutting rings on the ends of the drum. The scoring rings are formed with spaced recesses on notches on the outer edge to receive the bars and the bars are formed with recesses or notches on the inner edge to receive the rings. This construction permits the rings and bars to be assembled upon the drum in interlocking relationship so that the outer edges of the intersecting members are at the same level. The outer edges of both the rings and the bars are formed with teeth which are square in profile and rounded in cross section with a flat outer surface.

The intersecting rings and bars divide the surface of the cutter into rectangular spaces having the size and shape of the individual biscuits to be produced. Both the rings and bars are formed with shoulders, upon which a docker blocks is mounted within each rectangular space. The blocks are held in place by bolts which extend into the drum, and docker pins are pressed into the blocks to perforate the dough to allow steam to escape during baking. A stripper plate overlies the surface of each block and is spring mounted thereto to disengage the dough sheet from the scoring rings and bars.

It was found that the construction disclosed in the aforementioned patent was very expensive to manufacture because of the accurate machining required to interlock the rings and bars so as to achieve a tight fit at the intersecting score lines and accurately position the rings and bars to produce biscuits of uniform size. Also, replacement of the rings and bars, because of wear or breakage, requires disassembly of much of the cutter. In order to replace one of the rings, all of the bars must be removed and since the bars are held in place by the docker blocks, all the docker blocks on the cylinder must first be removed. In order to replace one of the bars, all of the docker blocks on each side of the entire length of the bar must be removed.

In view of the difficulties in repairing the cutters, its construction was changed to one in which a section of scoring ring and a section of scoring bar is formed integral with each docker block. The docker blocks are mounted in butting relationship so that the ring and bar sections of the assembled blocks abut to form continuing scoring members. When a section of scoring ring or bar breaks or wears it is easily replaced merely by replacing the docker block or blocks which carry the damaged scoring sections. The expense of manufacturing the cutter was not reduced by this construction, however, since the machining of these docker blocks is a difficult and time consuming operation.

SUMMARY

In view of the foregoing, an object of the present invention is to provide a rotary cutter assembly which is economical to manufacture.

Another object is to provide such a rotary cutter assembly which allows for efficient replacement of parts.

The foregoing objects are accomplished by providing a rotary cutter assembly comprising a drum, a plurality of dough scoring rings encircling the drum and spaced along the length thereof, each ring being formed of a plurality of segments, an annular row of docker blocks positioned between adjacent rings, the blocks being seated against the drum and spaced from each other, and dough scoring bar segments positioned between the blocks and abutting the rings.

BRIEF DESCRIPTION OF THE DRAWINGS

A preferred embodiment of the invention has been chosen for purposes of illustration and description, and is shown in the accompanying drawing, forming a part of the specification, wherein:

FIG. 1 is an elevational view of a rotary cutter assembly in accordance with the present invention acting on a dough sheet being transported by a conveyor belt.

FIG. 2 is a side view of the apparatus shown in FIG. 1;

FIG. 3 is a plan view of the apparatus shown in FIGS. 1 and 2 illustrating the dough sheet after the cutting and scoring thereof by the cutter assembly;

FIG. 6 is an exploded perspective view showing the various elements of the assembly;

FIG. 7 is an enlarged perspective view showing details of a docker block and scoring bar.

FIG. 8 is a fragmentary plan view of the cutter assembly taken along line 8—8 on FIG. 4;

FIG. 9 is a sectional view taken along line 9—9 on FIG. 8;

FIG. 10 is a sectional view taken along line 10—10 on FIG. 8;

FIG. 11 is a sectional view taken along line 11—1 on FIG. 8;

FIG. 12 is a sectional view taken along line 12—12 on FIG. 8;

FIG. 13 is an enlarged view of a portion of FIG. 11 showing the shape of the teeth employed on the scoring bars and rings;

FIG. 14 is an enlarged view showing the shape of the teeth used on the prior art scoring bars and rings;

FIG. 15 is a sectional view of a portion of the cutter assembly showing the action of a scoring bar upon a dough sheet;

FIG. 16 is a sectional view of a portion of the cutter assembly showing the action of the cut off bar upon a dough sheet;

FIG. 17 is a view showing the action of the prior art cutter assembly upon a dough sheet.

DESCRIPTION OF THE PREFERRED EMBODIMENT

Figure 4:
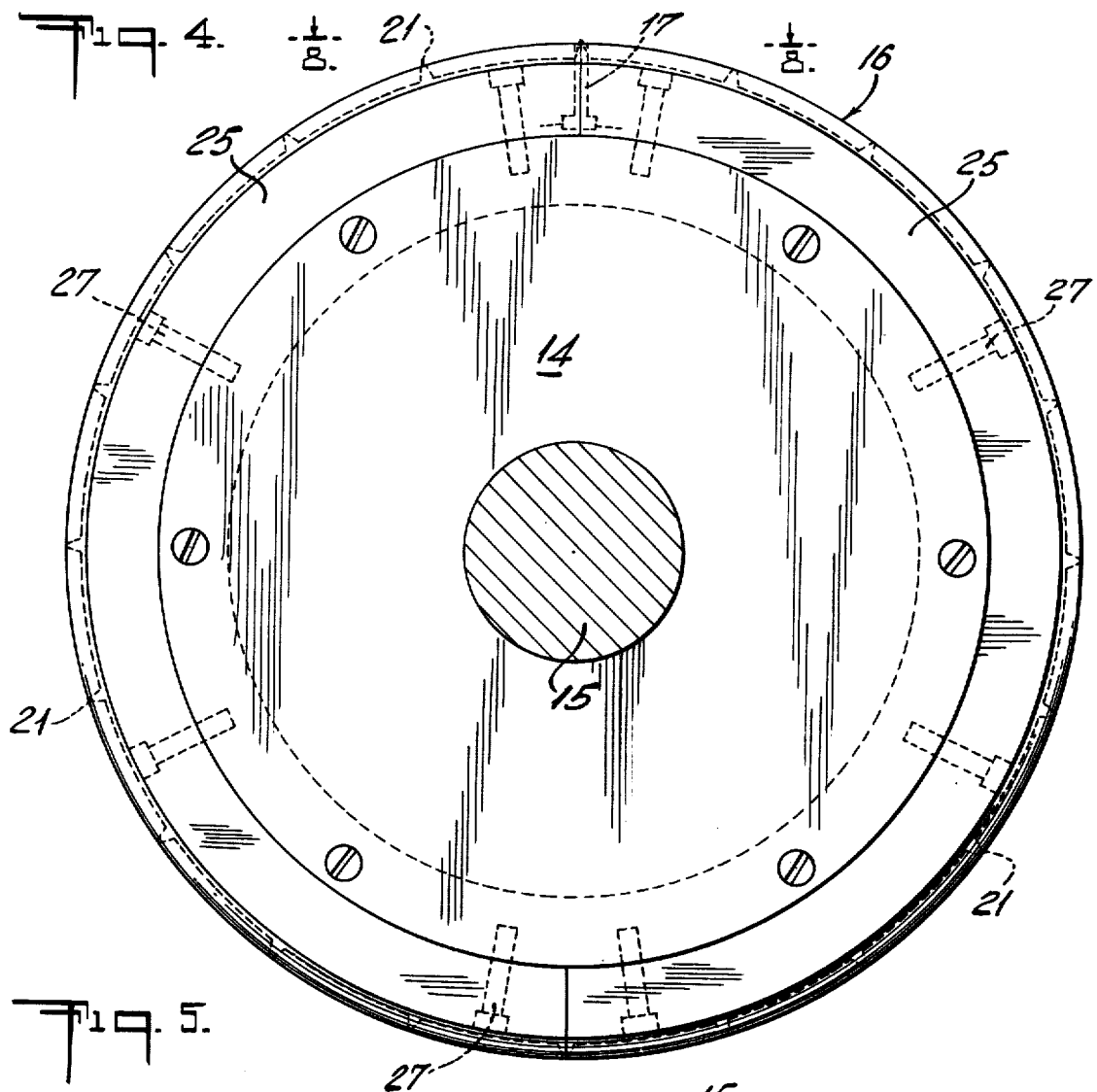
FIG. 4 is an enlarged end view of the cutter assembly.

Referring to the drawings in detail, there is shown a rotary cutter assembly 10 according to the present invention which, as shown in FIGS. 1–3, operates upon a continuous dough sheet S as it is moved under the cutter assembly upon a fabric conveyor belt 11. The cutting and scoring elements of the assembly 10 are mounted upon a drum 12 which is provided with end caps 14 that are keyed to a driven shaft 15. A pair cutting rings 16 are mounted at each end of the drum for trimming the edges of the dough sheet, and a cutting bar 17 extends longitudinally along the drum between the cutting rings 16 to divide the continuous sheet into rectangular dough sections, as shown in FIG. 3, to permit the dough to expand without buckling during baking. A series of scoring rings 19 are equally spaced along the drum between the rings 16. Each ring 19 extends from one side of the cutting bar 17 around the drum to the side of the bar. An annular row of docker blocks 20 encircle the drum between adjacent rings and scoring bars 21 are positioned between the blocks and extend between adjacent rings. The scoring rings and the scoring bars are provided with teeth 22 which partially cut through the dough sheet to outline the individual biscuits or crackers to enable the baked sheet to be divided into individual product pieces.

Figure 5:
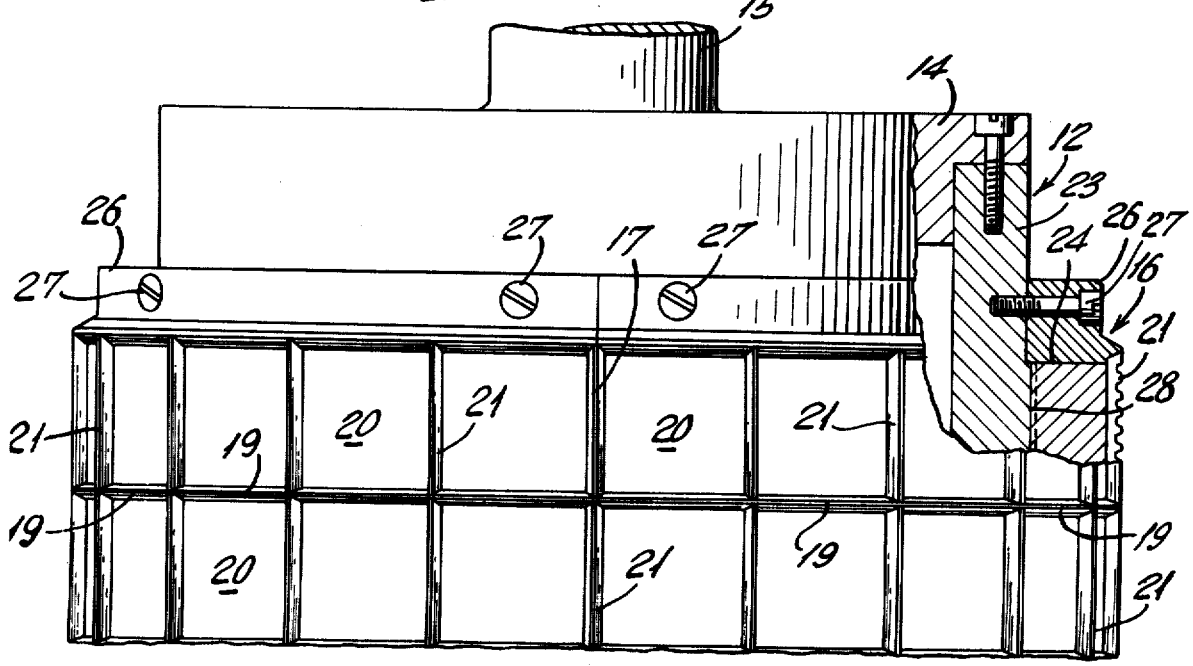
FIG. 5 is an enlarged plan view of a section of the cutter assembly.

As shown in FIG. 5, the drum 12 is formed with end sections 23 of reduced outside diameter to form a shoulder 24 against which the rings 16 are positioned. The rings 16 comprise two semi-circular sections 25 which are formed with a side flange 26. Screws 27 pass through the flanges 26 into threaded holes in the drum sections 23 to secure the sections 25 to the drum.

The drum is provided with longitudinally extending grooves 28 (FIGS. 6 and 9) which are equally spaced about its outer periphery. The cutting bar 17 is formed with a full length base flange 29 having a width equal to that of the grooves 28 and a thickness greater than the depth of the grooves. Each of the scoring bars 21 are formed with a base flange 30 which has the same width and thickness as the flange 29 to fit into the grooves 28.

The scoring rings 19 are formed, as shown in FIG. 6, from two arcuate sections 31 and 32 which abut each other at one end and are spaced at the other end to abut the sides of the cutter bar 17. The spaced ends are formed with notches 33 and 34 to accept the outer corners of the flange 29 of the bar 17. Each of the sections 31 and 32 are formed with a base flange 35 on one side thereof as shown in FIG. 11.

The docker blocks 20 are formed with arcuate outer and inner surfaces 36 and 37, transverse sides 39 and 40 perpendicular to the surfaces 36 and 37, and longitudinal sides 41 and 42 which slope inwardly from the outer surfaces. As shown in FIG. 9, the inner surface 37 is shaped to lie in contact with the outer surface of the drum, and the sides 41 and 42 lie along radii of the drum. The sides 41 and 42 (which extend longitudinally with respect to the drum) are undercut to engage the top and side walls of the bar flange 29 and 30. In like manner, as shown in FIG. 11, the side 40 of the majority of the docker blocks (which extends transversely of the drum) is undercut to engage the top and side walls of the base flange 35 of the scoring rings. The annular row of docker blocks positioned at the end of the drum (to the right as viewed in FIGS. 6 and 11) with their side 40 against the cutting ring, are not undercut along that side. The blocks 20 also contain a plurality of radial bores 44 with counter-sink enlargements 45 in which are positioned docker pins 46 having heads 47. The blocks 20 are secured to the drum by screws 49 set in counter-sunk bores in the blocks and threaded into the drum. The rings 19 and the bars 17 and 21 are held in place by the engagement of the undercut portions of the blocks with the flanges 35, 29 and 30 respectively.

The cutter bar 17 is provided with a tapered blunt edged blade portion 50 in which arcuate notches 51 (FIG. 12) are formed at regular intervals. As shown in FIGS. 6, 8 and 9, the blade is formed with gable-like lateral protrusions 52 on each side, against which the ends of the scoring ring sections 31 and 32 abut. These protrusions 52 are shaped to form scoring teeth to provide continuous score lines between the edges of the dough sections. The blade 50 and the docker pins 46 extend outwardly from the drum further than do the scoring rings and bars. The docker pins push through the dough sheet and engage the cloth conveyor belt and thus limit the penetration of the scoring teeth 22 into the dough sheet.

The cutting rings 16, as shown in FIG. 11, are formed with a tapered edge protion 54 and a shoulder 55 between the blade and the abutting docker blocks.

As shown in FIG. 11, the scoring rings 19 have a blade section 56 and a tapered edge section 57. Likewise, as shown in FIG. 9, the scoring bars 21 have a blade 59 and a tapered edge section 60. Those ends of the edge sections 60 which abut a scoring ring 19 extend outwardly at an angle from the blade 59 to form a sloping end surface 61 which lies against the sloping surface of the edge 57 of the ring 19. Those ends of the edge sections 60 which abut a cutting ring 16 include an extension 62 which overlies the shoulder 55 of the ring 16. The end of the extension 62 is angled to provide a sloping surface 64 which lies against the surface of the edge 54 of the ring 16. Therefore, the scoring bars 21 at the edges of the drum, which entend between a ring 16 and a ring 19, have an extension 62 and a surface 64 on one end and a surface 61 on the other end, as shown in FIG. 11. The remaining bars 21, which extend between rings 19, have a surface 61 on each end as shown in FIG. 7.

The teeth 22 of the scoring rings and the scoring bars, as shown best in FIG. 13, are of traperzohedron form, that is, they are trapazoidal in shape both in elevational and sectional views. The teeth 22 have flat crown surfaces 65, flat root surfaces 66 and straight sides 67 which slope at an angle of 45 degrees with the exception of the end teeth 69 of the scoring bars 21. The side 70 of the end teeth 69 is vertical to prevent weakening of the tooth. The side of the edges 57 and 60 are inclined at about 22 degrees from the vertical. The edges 57 and 60 and the tooth surfaces 65, 66, 67 and 70 are smoothly machined to minimize an tendency for the dough to adhere to the scoring rings and bars.

As shown in FIG. 14, the scoring members of the prior art rotary dough cutters are formed with edges having curved sides 71 which terminate in flat angled surfaces 72 forming a shallow point. The teeth cut into these scoring members have ends which include a nearly vertical section 74 which slopes only slightly from the root of the tooth to edge of the surfaces 72 and a section 75 of slightly increased slope which extends from that point to the crown of the tooth.

Because of the extensive machining required in the formation of the scoring members of the prior art constructions, the edges of the scoring members and the teeth thereon could not be carefully machined to provide smooth surfaces without making the expense of the cutter completely prohibitive. It was necessary therefore to mount a spring loaded stripper plate on each of the docker blocks to disengage the dough from the scoring members. In FIG. 17 there is shown a prior art construction of the type disclosed in the afore mentioned patent in which a stripper plate 76 is acted upon by springs 77. The plate 76 is normally held flush with the ends of the docker pins by the action of the springs 77. As the cutter rotates, contact with the dough sheet forces the stripper plate against the action of the springs while the scoring members and the docker pins act upon the dough sheet. As the cutter rotates away from the conveyor, the stripper plate is moved outwardly by the springs and disengages the dough from the cutter.

In addition to adding to the cost and complexity of the cutter, the stripper plates tend to compress the dough sheet (which is yeast raised) and force leavening gas therefrom to adversely effect the quality of the baked product.

In the present invention, the shape and smoothness of the scoring teeth 22 prevent the dough from adhering to the scoring members and the stripping plates are therefore unnecessary. The scoring ring sections 31 and 32, the docker blocks 20, and the scoring bars 21 are relatively simple to machine and therefore the assembly is relatively inexpensive to produce. Repair of the cutter can be accomplished quickly and inexpensively since most of the individual parts are small and can be replaced with minimum disassembly of the cutter. The replacement of one of the scoring bars 21 requires the removal of only two docker blocks and the replacement of a section of a scoring ring requires the removal of only one half of an annular row of docker blocks.

It will be seen from the foregoing that the present invention provides a rotary cutter assembly which is economical to manufacture and allows for efficient replacement of parts.

We claim:

1. A rotary cutter assembly comprising in combination a drum, dough cutting bar means extending longitudinally along the surface of said drum, a plurality of dough scoring rings encircling said drum spaced along said cutting bar means, said rings including ring segments abutting each side of said cutting bar means, an annular row of blocks positioned between adjacent rings, and dough scoring bar segments parallel to said cutting bar means positioned between said blocks and abutting said adjacent rings.

2. Apparatus according to claim 1, wherein said cutting bar means, said scoring bar segments and said scoring ring segments are formed with base flanges, and said blocks overly said flanges and are secured to said drum to lock said bar and segments in place.

3. Apparatus according to claim 2, wherein said ring segments have a base flange extending only from one side thereof whereby said ring segments can be removed by removing the block on only one side thereof.

4. Apparatus according to claim 3 wherein said drum is formed with longitudinal grooves spaced about its outer periphery for receiving said base flanges of said bar and said bar segments.

5. Apparatus according to claim 4 wherein said blocks lie against said drum, said base flanges extend above the surface of said drum, and the base of said blocks are undercut to receive said base flanges.

6. Apparatus according to claim 3, wherein said scoring rings and bar segments have tapered edge sections with flat converging sufaces and the ends of said edge sections of said bar segments slope outwardly to lie against the surfaces of the edge sections of the scoring rings.

7. Apparatus according to claim 6 wherein said edge sections of said scoring rings and scoring bar segments are formed with scoring teeth of traperzohedron form.

8. Apparatus according to claim 7, wherein said cutting bar means is formed with a tapered edge section and is provided with projections abutting said scoring ring segments, said projections having the same cross-sectional shape as said scoring ring segments.

* * * * *